March 27, 1951 M. G. NICHOLSON, JR., ET AL 2,546,401
MUTING SYSTEM FOR RADIO RECEIVERS
Filed April 24, 1947
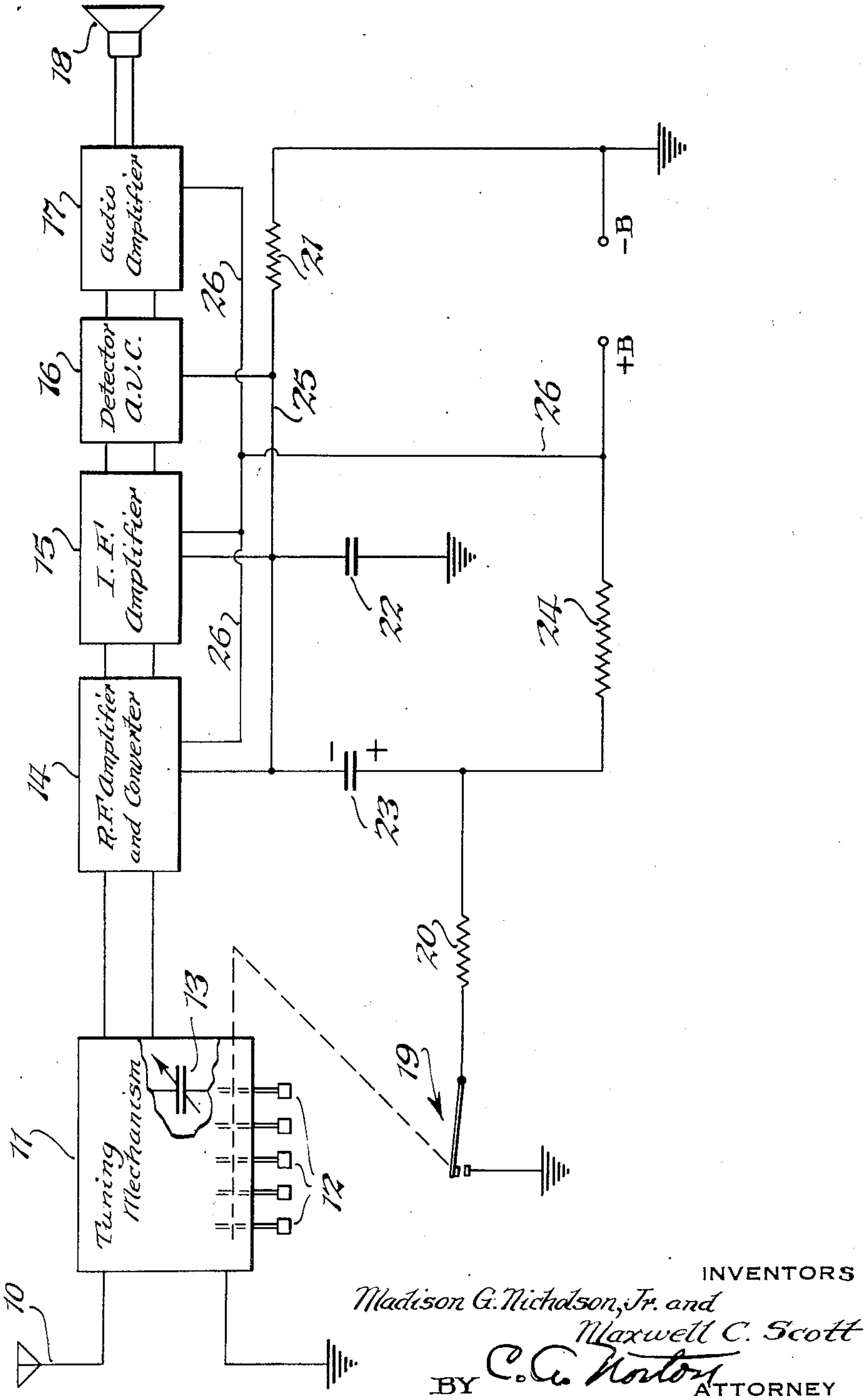
INVENTORS
Madison G. Nicholson, Jr. and
Maxwell C. Scott
BY C. G. Norton
ATTORNEY Patented Mar. 27, 1951

2,546,401

UNITED STATES PATENT OFFICE 2,546,401

MUTING SYSTEM FOR RADIO RECEIVERS

Madison G. Nicholson, Jr., Snyder, and Maxwell C. Scott, Lancaster, N. Y., assignors, by mesne assignments, to Sylvania Electric Products Inc., New York, N. Y., a corporation of Massachusetts Application April 24, 1947, Serial No. 743,686

7 Claims. (Cl. 250—20)

This invention relates to a muting system for radio receivers, and more particularly to a muting system particularly adapted for use with push button operated receivers.

Push button operation of radio receivers is likely to produce undesirable noises when the push buttons are operated to change the tuning from one channel to another. Sometimes these noises result from tuning through strong signals while the tuning is being changed, and sometimes from rebound, rocking, or slight oscillation of the tuning mechanism just before it reaches its final position. The noise in the latter case is particularly bad when the receiver employs a high inertia variable condenser for tuning in conjunction with so-called "spring-loaded" push button mechanism.

It is possible to eliminate this rocking or bouncing by mechanical means such as dash pot arrangements, but such mechanism is expensive and unduly increases the cost of the receiver.

Muting of receivers during change of tuning is well known, but in the past the methods of muting have been expensive, generally requiring the use of a relay, and such systems often produce undesirable noises which are frequently as objectionable as the noises that are being eliminated. Failures in such muting systems often render the entire receiver inoperative.

It is an object of this invention to provide an electrical muting system which will operate to make the receiver completely quiet during changes of tuning, which will not introduce noises of its own, and which requires a minimum of additional parts, and which parts as are required are inexpensive in themselves and require little or no change in the construction of the receiver in order to be installed.

It is a further object of this invention to provide a muting system which will not interfere with normal operation of the receiver in case of failure of the muting system.

Still other objects and advantages of our invention will be apparent from the specification.

The features of novelty which we believe to be characteristic of our invention are set forth with particularity in the appended claims. Our invention itself, however, both as to its fundamental principles and as to its particular embodiments, will best be understood by reference to the specification and accompanying drawing, in which the single figure is a circuit diagram showing the muting system in accordance with our invention as applied to a push button operated radio receiver.

In accordance with our invention, we bias the grids of the radio and intermediate frequency amplifier tubes negatively to a point beyond cut-off during the time necessary to complete the push button tuning operation. This could be done if the receiver had a source of sufficiently high negative voltage, by providing a switch having a pair of insulated contacts which would remain closed during the push button tuning operation.

However, in the usual radio receiver, there is not sufficient negative voltage available to accomplish the muting in the manner just described, and the switch required would be complicated and expensive.

By the invention herein described, we are able to accomplish the muting by the use of the readily available B voltage of the receiver, and a simple switch with a single insulated contact which is momentarily connected to ground at the start of the push button tuning operation.

In the drawing herewith, the details of the radio frequency amplifier, converter, intermediate frequency amplifier, detector, automatic volume control circuit, and audio amplifier are omitted for simplicity, since they are well understood and are not, per se, part of our invention.

Referring now more particularly to the drawing, 10 designates the antenna on which signals are received and 11 the tuning mechanism for selecting desired stations, which may include a number of push buttons 12 which are presettable so that upon operation of any button the receiver is tuned to a predetermined channel.

The tuning mechanism may comprise a gang condenser, a portion of which is shown as 13. Signals are passed in turn through radio frequency amplifier and converter 14, intermediate frequency amplifier 15, detector and A. V. C. circuit 16, audio amplifier 17, and finally to loud speaker 18. The —B side of the power supply is grounded as usual and is connected to the A. V. C. bus 25 through resistance 21. The grid returns of the radio frequency and intermediate frequency amplifier tubes are brought to A. V. C. bus 25.

The + side of the power supply +B may be connected to +B bus 26, to which the plates and screens of the various tubes requiring +B voltage are connected, and through resistance 24 to one side of condenser 23, the other side of which is connected to A. V. C. bus 25. Condenser 22 may be provided, connected between A. V. C.

bus 25 and ground. The common point of condenser 23 and resistor 24 may be connected through resistance 20 and switch 19 to ground.

Switch 19 is diagrammatically indicated as being operative when any push button 12 is pushed. Preferably switch 19 is arranged as a passing contact so that it is closed only momentarily when any push button is operated. The length of time during which switch 19 is closed may be varied, but normally the time of closure would not be longer than a small fraction of a second, for instance a few milliseconds.

The operation of the circuit is as follows: As long as switch 19 is open, condenser 23 is charged to the voltage of the B supply, the lower plate of the condenser being positive and the upper plate negative. When any push button 12 is pushed, switch 19 is closed momentarily. When this happens, the positively charged terminal of condenser 23 is connected to ground through resistance 20. This causes condenser 23 to partially discharge into condenser 22, the A. V. C. by-pass condenser.

The magnitude of the negative charge thus transferred to condenser 22 is determined by the ratio of condenser 23 to the sum of the capacities of condensers 22 and 23

$$\left(\frac{C_{23}}{C_{22}+C_{23}}\right)$$

multiplied by the value of the voltage across $C_{23}$ at the instant just prior to the closing of switch 19.

By proper selection of the value of capacity 23 in relation to that of capacity 22, the desired amount of negative voltage is applied to the grid return circuits of the various tubes to carry them past the cut-off point on the tube grid voltage v. plate current characteristic and thereby mute the receiver. The rate at which the receiver is restored to normal operation is determined by the values of condensers 22 and 23 and resistances 21 and 24, representing the total resistance of the A. V. C. system and the diode load resistor ordinarily employed therein to ground.

The length of time the receiver is muted is determined by the above two factors; that is, the amount of negative voltage in excess of the tube cut-off points and the rate of discharge of condensers 22 and 23. Thus, by proper choice of the values of these circuit elements, the length of the muting time can be made just equal or just a little longer than the time required to tune to the desired channel by means of the push button mechanism.

Resistor 20 is included in the discharge circuit to prevent excessive sparking at the contacts of switch 19. This resistor also reduces to a negligible value any electrical noise resulting from the closing of the switch. The value of resistor 20 should not be so large that the charging of condenser 22 from condenser 23 is not completed in the time during which the contacts of switch 19 are closed. These requirements are easily met in the receiver shown, with a value of 500 or 1,000 ohms. The only elements required by our system which are not already in the usual receiver are resistances 20 and 24, condenser 23, and switch 19.

Resistance 20 is not essential, being included principally to prevent sparking at the contacts of switch 19, and it may be found that it may be omitted without harmful effects. Trial in any case will quickly show whether this is so.

By way of example, and not in limitation, the following values of resistances and condensers have been found satisfactory:

| | |
|---|---|
| Resistance 21 | 2.2 megohms |
| Resistance 24 | 10 megohms |
| Resistance 20 | If used, 1,000 ohms |
| Condenser 22 | 0.1 mfd. |
| Condenser 23 | 0.1 mfd. |

Although the system as shown is applied to a receiver in a manner to mute it when changing the tuning by means of push buttons, it is apparent that it is also applicable to mute a receiver when changing from one wave band to another, as by using a wave change switch.

In the specification we have explained the principles of our invention and the best mode in which we have contemplated applying those principles, so as to distinguish our invention from other inventions; and we have particularly pointed out and distinctly claimed the part, improvement, or combination which we claim as our invention or discovery.

While we have shown and described certain preferred embodiments of our invention, it will be understood that modifications and changes may be made without departing from the spirit and scope thereof, as will be clear to those skilled in the art.

We claim:

1. In a radio receiver having a plurality of push buttons for station selection, at least one amplifier tube, and a source of B voltage, means for muting said receiver during tuning changes, comprising a condenser interposed between an amplifier grid return and ground, a second condenser interposed between the plus B terminal and said grid return, a connection including switch contacts connected in series between the plus B side of said second condenser and ground, said switch being provided with passing contacts arranged to be closed momentarily in response to operation of a push button to change the receiver tuning, and a resistance interposed in series between plus B terminal and said switch.

2. In a radio receiver having a plurality of push buttons for station selection, at least one amplifier tube, an automatic volume control line, to which the grid return of said amplifier tube is connected, and a source of B voltage, means for muting said receiver during tuning changes, comprising a first condenser connected between said automatic volume control line and ground, a second condenser interposed between the plus B terminal and said automatic volume control line, resistances interposed between said automatic volume control line and ground and between plus B and said second condenser, and a connection from the plus B side of said second condenser to ground, said connection including in series a pair of contacts arranged for momentary closure in response to operation of a push button to change the receiver tuning.

3. The combination claimed in claim 2 with a third resistance connected in series with said switch contacts.

4. The combination claimed in claim 2 with a third resistance connected in series with said switch contacts, the magnitude of said third resistance being small compared to that of the second resistance.

5. The combination claimed in claim 2 in which the time constant of the resistance-condenser circuit is so chosen that the receiver remains muted only substantially for the time required for completion of any push button tuning operation.

6. In a radio receiver having at least one amplifier tube, and a source B voltage, of means for muting said receiver during tuning changes, comprising a condenser connected between an amplifier grid return and ground, a second condenser connected between the plus B terminal and said grid return, a connection including switch contacts connected in series between the plus B side of said second condenser and ground, said switch contacts being arranged to be closed momentarily in response to tuning changes, and a resistance interposed in series between said plus B terminal and said switch.

7. In a radio receiver having at least one amplifier tube and a source of B voltage, means for muting said receiver during tuning changes, comprising a condenser connected between an amplifier grid return and ground, a second condenser interposed between the plus B terminal and said grid return, and means for applying a momentary ground to the plus B side of said second condenser in response to initiation of a tuning change, and a resistance connected between the plus B terminal and the plus B side of said second condenser.

MADISON G. NICHOLSON, Jr.
MAXWELL C. SCOTT.

REFERENCES CITED

The following references are of record in the file of this patent:

UNITED STATES PATENTS

| Number | Name | Date |
|---|---|---|
| 1,744,935 | Van der Pol | Jan. 28, 1930 |
| 2,133,128 | Beggs | Oct. 11, 1938 |
| 2,135,942 | Koch | Nov. 8, 1938 |
| 2,186,823 | De Tar | Jan. 9, 1940 |
| 2,186,825 | Dome | Jan. 9, 1940 |
| 2,265,394 | Ranley | Dec. 9, 1941 |
| 2,456,952 | Kluender | Dec. 21, 1948 |